Dec. 5, 1950  F. D. WULFF  2,532,688
BEVERAGE MAKING FILTER
Filed April 28, 1949

Inventor.
Frank D. Wulff
by J. Daniel Stuwe
Attorney.

Patented Dec. 5, 1950

2,532,688

UNITED STATES PATENT OFFICE 2,532,688

BEVERAGE MAKING FILTER

Frank D. Wulff, Chicago, Ill.

Application April 28, 1949, Serial No. 90,153

6 Claims. (Cl. 210—162)

This invention relates to a beverage making filter, and more particularly to a filter adapted for use in various vacuum coffee makers, tea makers, and the like.

One of the essential objects of this invention is to provide an improved, durable and efficient filter, for use in beverage makers and especially vacuum coffee makers, which filter is not readily breakable but is of extended and enhanced utility, and thus is adapted to replace the customary glass-rod filters, that are so easily broken, and is likewise adapted to replace various other types of filters.

Another important object of this invention is to provide a filter of this type which is constructed so as to be very economical in manufacture as well as highly efficient in use, and which is preferably accomplished by arranging the filter tubular in shape and constricting the tube at its open upper end, by flattening or converging it toward said end, and thereby providing a thin slot as a restricted inlet and outlet mouth for liquids.

A more particular object of this invention is to provide such an improved filter which is tubular in shape and comprises a narrow constricted passage serving as the inlet and outlet mouth, and which is further equipped with deflecting means in the form of a lip extending across said mouth and closely adjoining the same, in such a manner and position as to serve a compound purpose, as a deflecting lip for preventing liquid from spouting high up above said mouth, and also acting in conjunction with the restricted mouth to function as a highly efficient filter and facilitate the filtration of beverage therethru, but prevent the settling of any solid particles directly upon said mouth or seepage therethru.

A further object of this invention is to provide such a tubular filter containing spaced upper ridges having a narrow mouth therebetween and a deflecting lip placed thereover, and which ridges are serrated on top, so that when said lip rests upon said ridges the mouth cannot become closed or the filter rendered ineffective.

Another object of this invention is to provide an improved filter of this type which is arranged to fit properly in various sized and shaped throats of different styles of vacuum beverage makers.

These and various other objects and advantages are attained with this invention, as will become apparent from the following description, taken in connection with the accompanying drawing wherein the invention is disclosed in a few of its preferred forms, it being evident that other arrangements and forms of construction may be resorted to in carrying out the objects and purposes of this invention.

This application is a continuation-in-part of my prior application for patent for Percolator Filter, Serial No. 20,563, filed April 12, 1948, now abandoned.

Figure 1:
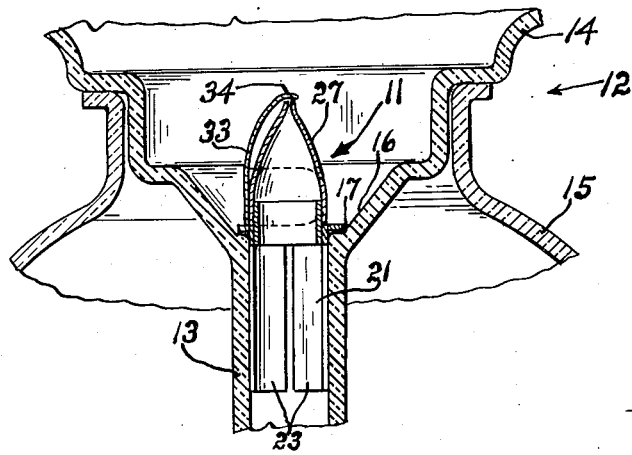
Fig. 1 is a vertical sectional view illustrating my invention in its preferred form, and as being mounted in its operative position in one type of vacuum beverage maker shown only in part.
Figure 3:
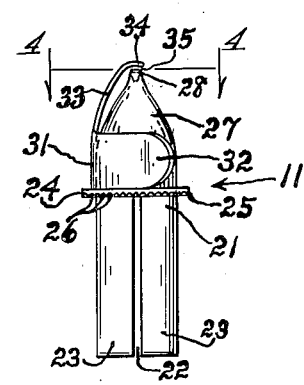
Figs. 2 and 3 are side elevational views of this form of filter, shown at right-angles to one another.
Figure 2:
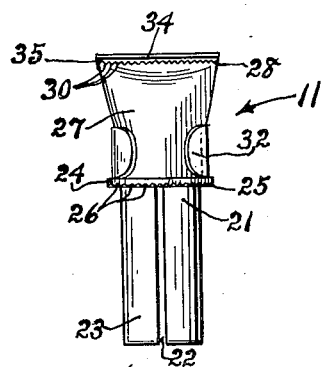
Figure 4:
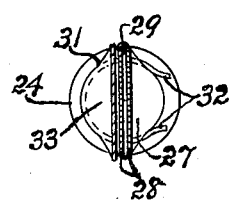
Fig. 4 is partly a top plan and partly a sectional view, taken on line 4—4 of Fig. 3.

In Fig. 1 of the drawing comprised in the present application my improved filter 11 is illustrated in conjunction with a surrounding portion of a vacuum coffee maker or beverage maker 12, this filter being shown in a preferred form and mounted in its operative position within the tubular part or throat 13 which depends from the upper bowl 14 into the lower bowl 15 of this coffee maker. At the upper end of this throat 13, or at its junction with bowl 14, is an outwardly extending or flaring funnel-like part 16, the lower end of which part functions as a seat 17 for supporting the filter.

This improved filter 11, in the form shown in Figs. 1 to 4 of this drawing, comprises a hollow lower part or tubular neck 21 which is arranged to fit within the throat 13 depending from bowl 14; and to have this neck adjust itself to a proper fit in said throat, the neck is preferably slitted longitudinally, as indicated at 22, to provide several fingers 23 which are slightly flexible, so that this neck is adapted to fit well within throats of various sizes or of different types of beverage makers.

Supporting means 24 extends outwardly around the filter, being preferably in the form of an annular shoulder or flange means around the neck, arranged to bear upon the seat 17 at the top of throat 13 for supporting the filter. Said flange in this form is also provided on its nether face 25 with small indentations or grooves 26, so as to allow for a slight seepage of liquid therethru between the tube and the throat, for highly heated steam upwardly and also for the final drainage downwardly of the remnant of beverage from the particle-containing lower part 16 of bowl 14.

A hollow head or tubular upper part 27 arises from said neck 21 and is preferably made integral therewith. It is located directly over the supporting flange 24, to be placed therewith upon said seat 17; and it is arranged at its upper end to provide passage means for the flow of liquid therethru, and this is preferably accomplished by flattening or converging the opposing wall parts toward said upper end to bring the end parts close together and thereby form a pair of slightly spaced upper edges or ridges 28 containing a restricted slot or narrow mouth 29 therebetween, to serve as the filter for the passage of heated water and steam upwards and of beverage downwards therethru. Small indentations or grooves 30 are preferably also provided in this form in the top of said ridges 28, thus providing a serrated inlet and outlet mouth on this filter.

Deflecting means 31 is also provided for my improved filter 11, and it is positioned to extend across and closely adjoining the restricted mouth 29. Herein, as shown in Figs. 1 to 4, this means 31 includes clasping elements in the shape of arms 32, which are slightly flexible and engage partly around the tubular upper part or head 27, so that the deflector may be detached from said head 27 by turning it thru substantially ninety degrees from the illustrated operative position, to facilitate cleaning the two members. A bracket part 33 extends up from the bight portion of said arms 32, and from the upper end of said part 33 is bent or is extended laterally a deflecting element in the shape of a lip 34, located closely above said mouth 29. In this improved form said lip is bent and the various parts of this filter are arranged and positioned so that the lip contacts or rests upon the ridges and extends just across said mouth 29, thus providing a restricted and serrated passage 35 underneath said lip for the filtration of beverage, and will prevent heated water and steam from spouting up thru throat 13 or above bowl 14. The arms 32 rest on flange means 24 and thus hold lip 34 upon ridges 28 and adjoining mouth 29.

This construction with its narrow mouth and lip thereover will hereby have said mouth and lip located close to the beverage making particles in said bowl part 16, and this arrangement thereby serves a compound or multi-purpose; as the lip serves to prevent liquid from spouting upwards thru the upper bowl; and as it is positioned closely over the mouth it further serves to provide a compound filter, by its horizontal passage 35 between the lip 34 and the ridges 28, and again by the narrow vertical mouth 29 between the two ridges; and this arrangement furthermore serves to prevent solid particles from settling directly upon the mouth and clogging the same, or oozing down therethru into the lower bowl.

Figure 5:
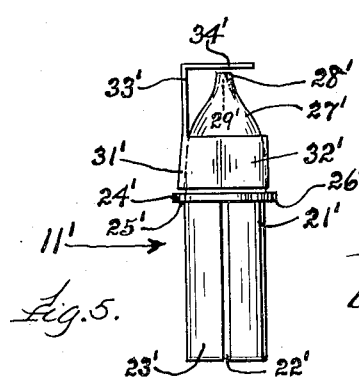
Fig. 5 is a vertical sectional view of a slightly different form of this filter, as previously disclosed in my above identified prior application.

Fig. 5 of the drawing illustrates my filter in a form as disclosed in my above identified prior application, and therein the shape and location of the deflecting means differs slightly from my present improved form. Said prior form, similar to the now disclosed improved form, comprises the filter 11' including a tubular lower part or neck 21' which is slitted at 22' providing flexible fingers 23', to fit various sized throats 13 of beverage makers 12. Said form also includes the flange means 24' extending around neck 21'; but that flange means 24' has its lower face 25' made flat so as to contain a circular peripheral bottom edge 26'. Said flange means 24', with its face 25' and edge 26', thus serves to form a seal between the exterior of that filter neck 21' and the interior of the parts 13 and 16 of the beverage maker, and will thus act to prevent any leakage of coffee grounds or other particles down between the neck 21' and the throat 13.

In that prior form the tubular upper part or head 27' is also converged or flattened upwardly to form a pair of slightly spaced ridges 28' with a restricted mouth or narrow slot 29' therebetween; but said ridges 28' are straight on top.

The deflector 31' in that form also includes slightly flexible arms 32' for engaging partly around head 27', so as to hold the deflector detachably in place thereon. A bracket part 33' extends up from said arms and from it is bent at an angle a deflecting lip 34', so as to extend across and closely above the restricted mouth 29'. However, said lip 34' is longer than the lip 34 in my improved form; and lip 34' extends farther beyond its adjoining mouth, to carefully prevent any settling of solid particles upon said mouth and clogging the same or seeping therethru.

However, my present improved form of filter is more promptly acting in use than said prior form; and, in view of the indentations 30 on ridges 28, the lip 34 will not, by resting upon the serrated ridges 28, cause any closing of said mouth or hinder the effective filtration of any beverage therethru.

The filter, in either of its forms, is preferably made of metal, such as stainless steel or aluminum, and the fingers are slightly flexible, so the filter will fit the throats of beverage makers of somewhat different types and sizes.

I claim:

1. A filter for use in a beverage maker containing a tubular throat having an outwardly extending upper part, said filter comprising a lower tubular neck adapted to fit in said throat, means around the neck to rest on said upper part and support the filter, a hollow head arising from the neck and having its opposite wall parts converging toward the top providing slightly spaced ridges having a restricted slot therebetween, said head and its slot being positioned closely adjacent said throat, and a deflecting lip extending across and close to the slot, thus preventing solid particles from settling directly upon the slot and further providing a filtering part between the lip and the ridges as well as by the restricted slot between the ridges.

2. A filter for use in a beverage maker containing a throat having an outwardly flaring upper part thereon, said filter comprising a tubular neck adapted to fit in said throat, flange means around the neck to rest in said upper part and support the filter, a hollow head arising from and located directly upon the neck and having its wall converged toward the top providing a pair of slightly spaced ridges containing a restricted mouth therebetween, and means on the head including a deflecting lip extending across said mouth and close thereto, said lip being positioned near said flaring part and preventing liquid from spouting upwards thru the beverage maker and also stopping solid particles from seeping down thru the mouth, as well as co-operating with the ridges in the filtering operation.

3. The filter of claim 2 and further distinguished by said tubular neck and head and the flange means being integral, and the deflecting means containing arms which clasp the head detachably and rest on the flange means, to facilitate separating the deflecting means and the head.

4. The filter of claim 2 and further distinguished by the ridges containing slight indentations on top and the deflecting lip bearing upon the tops of the ridges.

5. The filter of claim 2 and further distinguished by said ridges containing indentations on their tops, and said flange means containing slight indentations on the nether face, to hasten the filtering effectiveness of this device.

6. A filter for a beverage maker containing a depending throat, said filter comprising a tubular neck including fingers adapted to fit snugly in said throat, a head arising from the neck to be positioned closely adjacent said throat and having its wall converging toward the top providing adjacent ridges containing a narrow mouth therebetween, there being indentations in the top of the ridges, supporting means on the filter to rest on the upper part of the throat, and deflecting means bearing on the ridges and extending across said mouth, to prevent up-spouting of liquid from the latter and also aid in the filtering of the beverage.

FRANK D. WULFF.

REFERENCES CITED

The following references are of record in the file of this patent:

UNITED STATES PATENTS

| Number | Name | Date |
| --- | --- | --- |
| 1,056,048 | Nelson | Mar. 18, 1913 |
| 2,263,881 | Kors | Nov. 25, 1941 |
| 2,275,746 | Edwards | Mar. 10, 1942 |
| 2,313,112 | Wolcott | Mar. 9, 1943 |
| 2,438,302 | Simcich | Mar. 23, 1948 |